June 12, 1928. 1,673,471
M. A. PURDY
METHOD OF PURIFICATION OF SODIUM SULPHATE
Filed Feb. 7, 1923
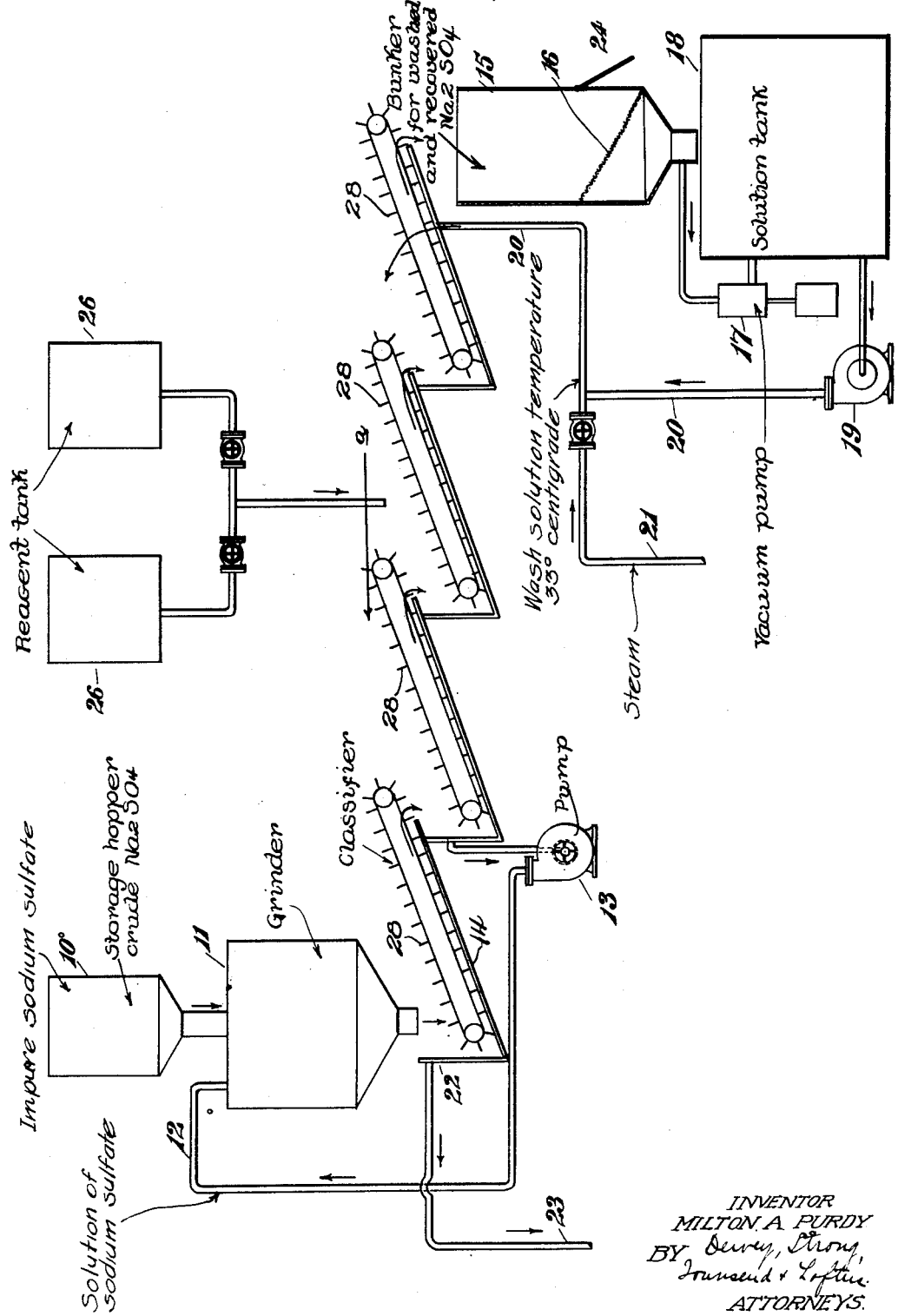
INVENTOR
MILTON A. PURDY
BY Dewey, Strong,
Townsend & Loftus
ATTORNEYS.

Patented June 12, 1928.

1,673,471

UNITED STATES PATENT OFFICE.

MILTON A. PURDY, OF OAKLAND, CALIFORNIA, ASSIGNOR OF ONE-HALF TO PACIFIC DISTRIBUTING CORPORATION, OF SAN FRANCISCO, CALIFORNIA, A CORPORATION OF CALIFORNIA.

METHOD OF PURIFICATION OF SODIUM SULPHATE.

Application filed February 7, 1923. Serial No. 617,430.

This invention relates to a method of purifying sodium sulphate, obtained from natural sources or otherwise, and particularly pertains to a method by which sodium sulphate may be purified, while practically remaining in the solid phase.

At the present time it is common practice to bring about the purification of sodium sulphate, by a series of steps during which the material is dissolved, concentrated solutions formed, and crystallization by evaporation suitably brought about by artificial means.

It is the principal object of the present invention to recover and purify sodium sulphate, obtained from natural deposits or otherwise, by a method which will make it possible to eliminate the usual steps of crystallization by evaporation, and to permit the sodium sulphate to be directly recovered as anhydrous crystals without dissolving the same.

The present invention contemplates, first, the removal of water insoluble impurities, such as mud, sand, etc., by water flotation; second, leaching and washing out water soluble impurities, and third, removing the sodium sulphate crystals as anhydrous crystals; the entire process being brought about by conditions producing insolubility of the sodium sulphate, in the washing solution, as it becomes saturated with the soluble impurities.

The invention is illustrated by way of example in the accompanying drawing, in which—

The figure is a diagrammatic flow plan of a plant in which the present invention may be practiced.

Referring more particularly to the drawing, 10 indicates a hopper or storage container for crude sodium sulphate. 11 indicates a grinder of suitable construction to which the crude sodium sulphate is delivered, and within which the material is ground to a desired size, preferably the approximate size of a pea, or smaller. A substantially saturated solution of sodium sulphate, or other salts, is delivered to the grinder through a suitable conduit 12, from a pump 13, which may draw the solution from the second deck of classifier as shown. An outlet from the grinder conducts the solution of salts and the ground material to the first of a series of classification separators 14. Due to the fact that a scouring action is being exerted, while the raw material during the process of wet grinding is also being mixed with the washing solution, the gangue will be somewhat disintegrated and the sodium sulphate crystals associated therewith will be soaked with the solution, thereby expediting their subsequent separation from the gangue and impurities.

The classification separators may be those commonly known as counter-current washing and flotation equipment of the continuously operating type, and are here indicated as having inclined floors forming spillways at their outer ends, which communicate with adjacent separators. The number of decks embodied in the separator is immaterial to the present invention, although it will be understood that a sufficient number of classification operations are carried out to insure that the impurities will be completely removed. The sodium sulphate crystals are expelled from the last of the classifier units into a bunker 15, having an inclined screen floor 16 upon the under side of which a suitable vacuum is maintained by a vacuum pump 17, thus insuring that the necessary amount of the final adhering solution will be drawn from the crystals through the screen and into a tank 18, while the sodium sulphate crystals may pass off into a suitable container or equipment to drive off the small amount of free moisture remaining if required, or directly to transportation equipment. A pump 19 is connected with the bottom of tank 18 and delivers solution through a pipe 20 to the last classifying unit 14, where it flows counter-directionally through the material which is passing from the last classifying unit to the bunker. This solution is heated by steam delivered through pipe 21.

Fresh water or sodium sulphate solution, obtained naturally or otherwise, is added continuously to tank 18 to make up for that amount which is passing counter-directionally to the flow of the sodium sulphate through the entire classifying system, and is discharged from the first classifying deck in which state it is heavily laden with gangue and salts other than sodium sulphate.

In describing the operation of the invention we will assume that the material to be treated is derived from natural deposits and that some of the impurities contained therein are insoluble and other impurities soluble; the insoluble materials being represented by mud, sand, and the like, and the soluble impurities being represented by sodium chloride, magnesium chloride, water of crystallization and the like. The material derived from the natural source or deposit is delivered to a storage bin or hopper, generally indicated at 10. The material is transferred from the hopper to a grinder or crusher of any suitable construction, indicated at 11, where it is wet crushed or ground to a suitable size before it is delivered to the first classifying or washing unit indicated at 14.

The washing solution employed may also be derived from the natural source or otherwise, but will, in most instances, contain a certain amount of sodium sulphate in the solution and also a certain proportion of the impure salts specified. The classifying or washing units are placed on a slight incline and the washing solution is delivered to the last of the units by means of a pipe 20, that is, the flow of the washing solution is in the general direction of the arrow a, this being due to the fact that the last unit is placed at a higher elevation than the first washing or classifying unit indicated at 14; the intermediate units being arranged at intermediate levels to present a gradual incline.

The wet crushing or grinding of the sodium sulphate is of considerable importance as adhering gangue, in the form of insoluble impurities, such as mud or sand, is scoured off and loosened and the sodium sulphate crystals are thus freed of the same. The mud and sand are usually very fine and as a certain amount of agitation is maintained in each washing and classifying unit, it can readily be seen that the insoluble impurities will pass off with the solution and discharge at the point indicated at 22 through pipe 23. The sodium sulphate crystals travel in a direction opposite to the flow of the washing solution as they are moved by mechanical means, such as conveyors 28, rakes or the like. In other words the crystals are subjected to several washing actions and as such will leave the last unit in a commercially pure state.

One of the important features of the present invention is the temperature maintained in the washing solution. In actual practice the temperature is maintained at substantially 33° centigrade or slightly higher. This is of great importance as practice has proven, first, that the sodium sulphate crystals remain insoluble in the saturated solution when this temperature is maintained; secondly, practice and actual experience have shown that sodium sulphate crystals, containing water of crystallization, are broken down and the water of crystallization liberated. In other words, the product obtained in this instance will be an anhydrous sodium sulphate crystal. Third, experience has also shown that the soluble impurities, such as sodium chloride, magnesium chloride, etc., are beneficially affected by the temperature as increased temperature increases the solubility. It can, therefore, be seen that as the sodium sulphate crystals advance from one classifying and washing unit to another, that the insoluble impurities, such as mud, sand, etc., are gradually liberated and carried away by the washing solution; also, that adhering or included soluble impurities, such as sodium chloride, magnesium chloride, etc., gradually dissolve and as such liberate the pure sodium sulphate crystals. Further, that sodium sulphate crystals which contain water of crystallization are broken down and as such are changed to anhydrous crystals, and it is due to these conditions that a commercially pure anhydrous sodium sulphate crystal is finally obtained.

There is another important factor which also enters into the operation of the entire unit, that is, I have found that the soluble impurities, such as sodium chloride, magnesium chloride, etc., gradually become present in sufficient quantities to practically supersaturate the solution and that as the saturation with sodium chloride and magnesium chloride proceeds, the sodium sulphate contained in the solution is displaced and driven off as anhydrous sodium sulphate crystals. Hence it can readily be seen that any sodium sulphate contained in the wash solution is also obtained and, practically speaking, complete extraction of sodium sulphate is secured.

The solution employed for the wet grinding is preferably taken from the second stage of the washing and classifying unit as shown on the diagrammatic drawing. The solution at this point is fairly saturated with the impure salts and as such is delivered to the grinding unit. This is of some importance as it prevents dissolving of the sodium sulphate during the grinding operation. In other words the greater the impure content of the solution, the less the loss of sodium sulphate by dissolving action.

The solution is maintained at substantially 33° centigrade, or slightly in excess thereof, by steam which is also admitted through the pipe 20, that is, the pipes 20 and 21 are jointly connected as shown in the diagrammatic view. The steam enters the solution and as such gives up the heat and also condenses, thereby adding to the quantity of wash solution maintained.

The storage tank, indicated at 18, is continuously supplied with washing solution derived from the natural source or otherwise as the washing solution is not recirculated, this being due to the fact that it would soon become supersaturated with the impure salts.

The pure sodium sulphate crystals discharging from the last unit are delivered to a tank or bunker indicated at 15 where adhering water is removed, that is the material packs in the bunker and is supported by a screen 16. The vacuum pump 17 will thus act to dehydrate the crystals, after which the door 24 may be swung outwardly to permit the crystals to finally discharge. The liquid withdrawn or removed from the bunker is collected in tank 18 and is returned to the classifying units through pipe 20. In the event that there is an objectionable acid content in the material being treated, or when iron salts and other impurities are present, reagent tanks, such as indicated at 26, may be provided to supply the wash water with suitable reagents which will neutralize the acid condition and insure that the objectionable salts will be precipitated and floated off, or converted to such soluble salts that may be washed out as before described.

From the foregoing it can be seen that by the method here disclosed, it is possible to cheaply and effectively purify sodium sulphate without dissolving the same and therefore without utilizing the costly process commonly required in practice of artificially evaporating large volumes of water. The method here described at the same time insures a commercially pure product which is here classified as a dry anhydrous salt of sodium sulphate.

Having thus described my invention, what I claim and desire to secure by Letters Patent is—

1. A method of purifying anyhydrous sodium sulphate, which consists in wet crushing the sodium sulphate in contact with a substantially saturated solution thereof maintaining a flow of solution containing sodium sulphate, said solution gradually decreasing in strength, and advancing the anhydrous sodium sulphate discharged by the crusher through said solution to a point of discharge where the solution will have the least strength.

2. A method of purifying anyhydrous sodium sulphate, which consists in wet crushing the sodium sulphate in contact with a substantially saturated solution thereof maintaining a flow of solution containing sodium sulphate, said solution being substantially saturated at one point and gradually decreasing in strength countercurrent-wise, depositing the sodium sulphate discharged from the crusher in said flowing solution at a point where it is substantially saturated, and advancing the same through the solution and in a countercurrent direction to a point of discharge.

3. A method of purifying anhydrous sodium sulphate, which consists in wet crushing the sodium sulphate in contact with a substantially saturated solution thereof, maintaining a flow of solution containing sodium sulphate, said solution being substantially saturated at one point and gradually decreasing in strength, countercurrent-wise, depositing the sodium sulphate discharged from the crusher in said flowing solution at a point where it is substantially saturated, advancing the same through the solution and in a countercurrent direction to a point of discharge, and maintaining said solution consisting of sodium sulphate at a temperature of approximately 33° centigrade.

MILTON A. PURDY.